United States Patent [19]
Tanaka et al.

[11] Patent Number: 5,997,292
[45] Date of Patent: Dec. 7, 1999

[54] HIGH-TEMPERATURE GAS GENERATOR

[75] Inventors: Ryoichi Tanaka; Toshiaki Hasegawa; Jun Sudo; Tsutomu Yasuda, all of Yokohama; Yukio Mizutani; Masashi Katsuki, both of Suita; Hiroshige Ikebe, deceased, late of Kashiwa, all of Japan, by Mihoko Ikebe, heir

[73] Assignee: Nippon Furnace Kogyo Kabushiki Kaisha, Kanagawa, Japan

[21] Appl. No.: 08/776,991

[22] PCT Filed: Aug. 10, 1995

[86] PCT No.: PCT/JP95/01603

§ 371 Date: Feb. 6, 1997

§ 102(e) Date: Feb. 6, 1997

[87] PCT Pub. No.: WO96/05474

PCT Pub. Date: Feb. 22, 1996

[30] Foreign Application Priority Data

Aug. 10, 1994 [JP] Japan ................................. 6-208277

[51] Int. Cl.$^6$ ........................................................ F27D 17/00
[52] U.S. Cl. ............................ 432/181; 432/180; 432/219
[58] Field of Search .................................... 432/179, 180, 432/181, 219, 222

[56] References Cited

U.S. PATENT DOCUMENTS

| | | | |
|---|---|---|---|
| 3,207,493 | 9/1965 | Swain | 432/180 |
| 4,522,588 | 6/1985 | Todd et al. | 432/181 |
| 4,856,492 | 8/1989 | Kawamoto | 432/180 |
| 5,431,147 | 7/1995 | Tanaka et al. | 432/181 |
| 5,839,894 | 11/1998 | Schedler et al. | 432/181 |

OTHER PUBLICATIONS

Patent Abstracts of Japan—Publication No. 07083585 A, Publication Date Mar. 28, 1995—Heat Accumulative Type Heat Exchanger . . . —Ryoichi, et al.

Japanese Abstract of No. 1–219412 (A)—Sep. 1, 1989—Burning Device in Radiation Pipe—Nakamachi.

Japanese Abstract No. 6–147461 (A)—May 27, 1994—Method for Controlling Heat Accumulative Type Burner—Akiyama.

Japanese Abstract 6–221526 (A)—Aug. 9, 1994—Alternative Combustion Heat Accumulating Type Burner—Moriya.

Japanese Abstract 2–21161 (A)—Jan. 24, 1990—Heating Apparatus—Okuno.

Japanese Abstract 57–104040—Jun. 28, 1982—Hot Air Type Space Heater—Sawai.

Japanese Abstract 56–168053 (A)—Dec. 24, 1981—Saving Method of Energy in Heating Water of Bath and Vessel Therefor—Fujimiya.

*Primary Examiner*—Tu Ba Hoang
*Assistant Examiner*—Gregory A. Wilson
*Attorney, Agent, or Firm*—Notaro & Michalos P.C.

[57] ABSTRACT

According to the present invention, gas which contains no impurities and has a high temperature of approximately 700 to 1400° C. can be supplied for a long period with a short preparation time, and fluctuation in the temperature during supply can be reduced. The apparatus according to the present invention includes regenerators 4 and 5 (15 and 16) capable of transmitting sensible heat of the combustion gas to combustion air with high effectiveness by the changing-over operation at short periods and burner apparatuses 2 and 3 for mainly supplying gas fuel for combustion, constitutes a combustion apparatus for accumulating heat in the regenerators 4 and 5 by supplying the combustion air or arbitrary gas to be heated through the regenerators 4 and 5 and exhausting the combustion gas, and is designed so that the arbitrary gas that has reached a predetermined temperature is supplied outside for a predetermined time by interrupting combustion and passing only air or the arbitrary gas through the regenerators 4 and 5 after the regenerators 4 and 5 have reached a predetermined temperature.

11 Claims, 9 Drawing Sheets

FIG. 11

HIGH-TEMPERATURE GAS GENERATOR

FIELD OF THE INVENTION

The present invention relates to an apparatus for generating extremely-high-temperature gas containing no impurities. More particularly, the present invention relates to a high-temperature gas generating apparatus mainly used as an experimental apparatus utilizing high-temperature gas, such as an apparatus for testing cracking/ignition characteristic of various types of fuel at a high temperature of approximately 1000 to 1600° K. (approximately 727 to 1327° C.) or a high-temperature gas supply source in a pyrogenetic reaction apparatus for a product that does not allow mixture of impurities.

BACKGROUND OF THE INVENTION

In order to obtain high-temperature gas containing no impurities, it has been general to use an electrothermal type heating apparatus using an electric heater or an indirect regenerative type heating apparatus using a regenerative tube.

However, in the electrothermal type heating apparatus, a start-up time is long because heating elements must be prevented from being disconnected, and this type of heating apparatus is therefore practically inconvenient.

Further, the heating apparatus using a tube type regenerator is inferior in the effectiveness of regenerator, and it is difficult to product this type of heating apparatus having practical material and structure in order to obtain gas having a high temperature of approximately 1000 to 1600° K.

In these prior art heating apparatuses, a time for which the high-temperature gas can be supplied is short, and there is a problem such as that a preparation time for making it possible to supply the high-temperature gas is long. Furthermore, fluctuation in temperature is disadvantageously large because the temperature suddenly drops.

DISCLOSURE OF THE INVENTION

It is therefore an object of the present invention to provide a high-temperature gas generating apparatus by which a time before the next cycle for supplying the high-temperature gas is shortened, the high-temperature gas can be supplied for a long time, and fluctuation in the temperature during supply of the gas can be small.

To this end, a high-temperature gas generating apparatus according to the present invention is characterized in that: a burner apparatus which has a regenerator and exhausts combustion gas through the regenerator is disposed on both sides of a channel type combustion chamber having a high-temperature gas output means; an exhaust means and a means for supplying arbitrary gas that is to be heated to reach a high temperature are connected to the regenerator of each burner apparatus to constitute a passage along which the combustion gas is exhausted through the regenerator and a passage along which the arbitrary gas is led to the channel type combustion chamber via the regenerator and supplied from the high-temperature gas output means to an arbitrary position; the burner apparatuses alternately perform combustion so that the both regenerators reach a predetermined temperature; and combustion is thereafter stopped to pass the arbitrary gas through the regenerators and the arbitrary gas whose temperature has reached a predetermined value is supplied from the high-temperature gas output means to outside for a predetermined time.

According to this apparatus, when the combustion gas generated by the burner apparatuses that alternately carry out combustion passes through the regenerator of the burner apparatus provided on the opposed side and exhausted, sensible heat and waste heat of the combustion gas are recovered in the regenerator by direct heat exchange. Part of heat recovered in the regenerator is used for preheating the combustion air by direct heat exchange with extremely-high effectiveness to be returned to the combustion apparatus. In the combustion apparatus, alternately combustion is repeated to raise the temperatures of the both regenerators. Here, when the preheated combustion air is used to burn the fuel, the temperature in the furnace of the burner apparatus is suddenly raised and high-temperature heat can be accumulated in the regenerator on the opposed side. The effectiveness of regenerator can be improved by rapidly changing over the combustion gas and the combustion air that alternately flow through the regenerator in a short time, for example, by changing over them twice or more per minute, and the speed for raising the temperature of the regenerator can be hence increased to shorten the preparation time for supplying the high-temperature gas. At this time, if combustion of the burner apparatus is stopped to flow arbitrary gas (including air) through the regenerator in place of the combustion air, it is readily possible to obtain gas including no impurities by direct heat exchange with the regenerator without changing composition of the air.

In addition, according to the present invention, a portion to which cold combustion air flows and a portion from which high-temperature combustion gas flows are opposed to each other with the combustion chamber therebetween, and a difference in temperature is thereby eased when the combustion air and the combustion gas flow through the combustion chamber to prevent the regenerator from being damaged by thermal stress even if operations for rapidly cooling down and heating are repeated in a short time.

Moreover, according to the high-temperature gas generating apparatus of the present invention, since the furnace temperature can be rapidly changed from a low temperature to a high temperature by controlling a quantity of combustion, the gas supply time corresponding to a request from the apparatus utilizing the high-temperature gas can be assured.

Further, according to the high-temperature gas generating apparatus of the present invention, since the arbitrary gas is heated by utilizing heat accumulated in the regenerator, a heat capacity can be increased and the temperature fluctuation of the arbitrary gas can be decreased.

Furthermore, according to the present invention, a plurality of the above-described high-temperature gas generating apparatuses are provided and their high-temperature gas output means are connected to each other through a passage change-over means so that the high-temperature gas is continuously generated and supplied by the change-over operation of the fluid change-over means. In this case, since the high-temperature gas is constantly supplied from any of the high-temperature gas generating means, the high-temperature gas can be continuously supplied.

According to the present invention, the high-temperature gas generating apparatus is designed so that: a regenerator that does not perform heat exchange with the combustion air and is only heated by the combustion gas is installed in the high-temperature gas output means and an exhaust system is connected to the regenerator; part of the combustion gas is exhausted through the regenerator in the high-temperature gas output means during alternate combustion and is only used for heating arbitrary gas which is to be heated to reach a high temperature. In this case, even if there is a difference in temperature between the respective regenerators in the burner apparatuses provided on the both sides of the combustion chamber for alternately combustion, the difference in temperature between the gas heated by one regenerator and the gas heated by the other is adjusted when these gases pass through the regenerators in the high-temperature gas output means, and they are taken out as the high-temperature gases having the same temperature.

In addition, according to the present invention, the high-temperature gas generating apparatus is designed so that: a pair of burner apparatuses each of which has a regenerator and performs supply of arbitrary gas that is to be heated and exhaust of the combustion gas through the regenerator are provided; a combustion chamber of each burner apparatus is connected to a high-temperature gas output means to constitute a passage along which the combustion gas is exhausted through the regenerator of one burner apparatus and another passage along which the arbitrary gas that is to be heated is led from the regenerator to the combustion chamber and supplied from the high-temperature gas output means to an arbitrary position: and the burner apparatuses alternately carry out combustion and the two passages are changed over to alternately generate and continuously supply the high-temperature gas. In this case, since the high-temperature gas is constantly supplied through any of the regenerators, the high-temperature gas can be continuously supplied.

Moreover, in the high-temperature gas generating apparatus of the present invention, the high-temperature gas output mean is a three-way valve for connecting the combustion chambers of the two burner apparatuses with each other, and the remaining port of the three-way valve is used as a high-temperature gas output port to alternately open the combustion chambers of the burner apparatuses. In such a case, since only the high-temperature gas alternately flows through the three-way valve that is the fluid change-over means, there occurs no heat shock.

According to the high-temperature gas generating means of the present invention, a bypass path is provided for communicating combustion chambers of a pair of burner apparatuses with each other and communicating spaces between the respective combustion chambers and regenerators with each other; a three-way valve is provided to this bypass path and the remaining port of this valve is used as a high-temperature gas output port; an output of each regenerator is connected to a four-way valve that is selectively connected to an air supply system and an exhaust system; the air supplied from the air supply system is preheated to become high-temperature gas by passing through the regenerator and part of the preheated air is burnt as the combustion air by a burner disposed just in front of the other generator; and other part of the preheated air is continuously supplied from the high-temperature gas output port to outside through the bypass path. In this case, the air passed through the regenerator is partially supplied from an arbitrary gas output means as the high-temperature gas and also partially supplied to the burner apparatus of the other combustion apparatus so that combustion is performed using the high-temperature air. The low-calorie gas fuel can be, therefore, used. In addition, since only the high-temperature gas alternately flows through the three-way valve, there occurs no heat shock.

According to the present invention, the high-temperature gas generating apparatus comprises at least a pair of burner apparatuses which include regenerators each of which is capable of passing the combustion air and the combustion gas to the same area at different times by relatively rotating between two passages through which the combustion air and the combustion gas flow and transmitting sensible heat of the combustion gas to the combustion air with high efficiency, and raise the temperature of the regenerators by supplying the combustion air and exhausting the combustion gas through the regenerators, the high-temperature gas generating apparatus characterized in that: the air is supplied to each burner apparatus and the air is passed through the regenerator; one burner apparatus performs combustion using the air, while the other burner apparatus heats the air as arbitrary gas that is to be heated in the regenerator; and the thus-heated air is continuously supplied to outside. In this case, a temperature in the combustion chamber can be rapidly increased by relative rotation of the regenerator and the preparation time for the high-temperature gas supply is shortened, as similar to the case where a pair of burner apparatuses alternately carry out combustion.

In addition, the high-temperature gas generating apparatus according to the present invention interrupts injection of the fuel to the burner apparatus just before changing over the flow to scavenge using fresh air. In this case, since the combustion gas remaining in the regenerator and the passage is removed, the high-temperature gas is not polluted with the combustion gas.

Also, the high-temperature gas generating apparatus according to the present invention is provided with a flow straightening cylinder in the high-temperature gas output means. In this case, pulsation of the high-temperature gas is eliminated by the flow straightening cylinder and the gas is smoothed, whereby stable supply of the gas is realized.

The high-temperature gas generating apparatus according to the present invention comprises: two passages through which arbitrary gas that is to be heated and the combustion gas flows; a regenerator, connected in the middle of each passage, which can pass the arbitrary gas and the combustion gas to the same area by relative rotation between these passages at different times and transmit sensible heat of the combustion gas to the arbitrary gas with high effectiveness; and a burner apparatus for exhausting the combustion gas through the regenerator, exhaust of the combustion gas and supply of the arbitrary gas being simultaneously performed through different areas of the regenerator, and gases passing through the regenerator being relatively changed over by intermittently or continuously rotating regenerator when the regenerator has reached a predetermined temperature to continuously supply the arbitrary gas, that has reached a predetermined temperature, to the out-side. In this case, by simultaneously passing the arbitrary gas that is to be heated and the combustion gas to different areas of the regenerator and relatively rotating the regenerator when the regenerator has reached a predetermined temperature, the gases passing through the regenerator are changed over so that the arbitrary gas is heated by passing the area through which the combustion gas has passed, thereby enabling continuous supply. Since relative rotation of the regenerator enables the arbitrary gas to be heated in the opposed area while constantly performing combustion in the burner apparatus, the high-temperature gas can be continuously supplied.

In the high-temperature gas generating apparatus according to the present invention, the regenerator intermittently or continuously rotates and has a conical shape at one end thereof, and a passage for leading the combustion gas in the regenerator and a passage for outputting the arbitrary gas that has been heated through the regenerator are provided to face the conical end so as to be orthogonal with respect to the regenerator. In this case, the combustion gas is straightened at the conical end when the combustion gas flows into the regenerator, and it disperses uniformly at the entire opening to pass through the regenerator in an uniform velocity distribution. The regenerator is thus uniformly heated, and the time for rising the temperature of the regenerator to a predetermined value is shortened. Also, time until the high-temperature gas is supplied can be made shorter, and the arbitrary gas can be uniformly heated.

In the high-temperature gas generating apparatus according to the present invention, the burner apparatus uses oxygen-enriched air to mainly burn the gas fuel. In this case, since combustion is carried out by utilizing oxygen-enriched air, a quantity of combustion gas can be reduced as compared with a case where only the air is used, and a pressure of the arbitrary gas can be increased, whereby the high-temperature gas can not be polluted with the combustion gas without mixing the combustion gas into the arbitrary gas.

BRIEF DESCRIPTION OF THE DRAWINGS

FIGS. 3A to 3D are explanatory views showing a specific configuration and an operating method of the apparatus according to the second embodiment illustrated in FIG. 2, wherein FIG. 3A shows the case where high-temperature gas is emitted using a regenerator provided on an upper side of the right high-temperature gas generating apparatus, FIG. 3B shows the case where the high-temperature gas is emitted using a regenerator provided on a lower side of the right high-temperature gas generating apparatus, FIG. 3C shows the case where the high-temperature gas is emitted using a regenerator provided on an upper side of a left high-temperature gas generating apparatus, and FIG. 3D shows the case where the high-temperature gas is emitted using a regenerator provided on a lower side of the left high-temperature gas generating apparatus;

BEST MODES FOR EMBODYING THE INVENTION

The configuration of the present invention will now be described in detail hereinafter based on embodiments illustrated in drawings.

Figure 1:
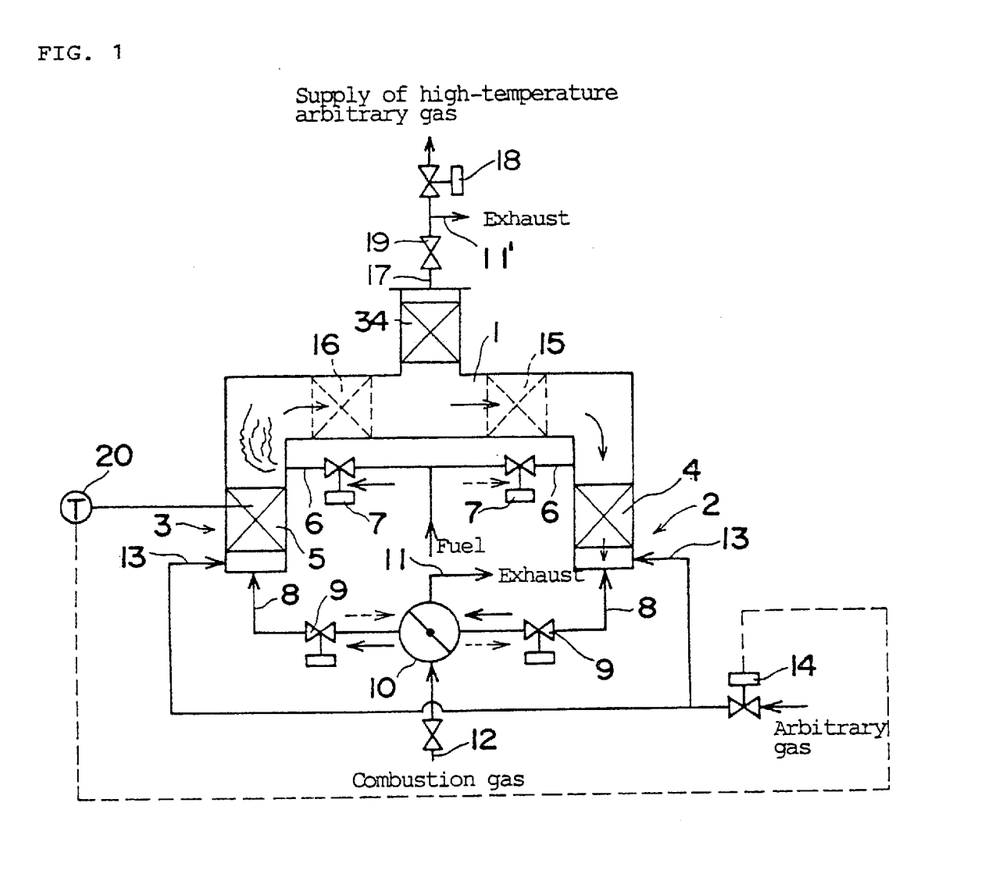
FIG. 1 is a principle view showing a first embodiment of a high-temperature generating apparatus according to the present invention.

FIG. 1 shows an embodiment of a high-temperature gas generating apparatus according to the present invention. The high-temperature gas generating apparatus has burner apparatuses 2 and 3 having regenerators 4 and 5 at both ends of a channel type combustion chamber 1, and an arbitrary gas output means 17 for outputting arbitrary gas that is to be heated in the near-center of the combustion chamber 1. In this embodiment, the arbitrary gas output means 17 is composed of a duct including a regenerator 34, and has a flow control valve 19 and a solenoid valve 18 for blocking the passage with an exhaust system 11' connected between the flow control valve 19 and the solenoid valve 18. In the apparatus, the burner apparatuses 2 and 3 provided at both ends alternately perform combustion when accumulating heat to exhaust combustion gas through the regenerator 4 or 5 of the currently-stopped burner, and the combustion gas is partially taken out from the exhaust system 11' through the regenerator 34. When supplying high-temperature gas, the both burner apparatuses 2 and 3 are stopped, and arbitrary gas that is to be heated is led in place of the combustion air into the combustion chamber 1 through the both regenerators 4 and 5 and supplied to any desired equipment such as an experimental apparatus from the arbitrary gas output means 17 provided in the center of the combustion chamber 1.

The burner apparatuses 2 and 3 are constituted by fuel supply means 6 and 6 for directly injecting fuel into the combustion chamber 1, the regenerators 4 and 5, and two combustion air supply means 8 for supplying the combustion air to the combustion chamber 1 through the regenerators 4 and 5. Also, to the two combustion air supply means 8 or the regenerators 4 and 5 are connected two arbitrary air supply systems 13 and 13 on the upstream side so that the arbitrary air can be supplied to the combustion chamber 1 through the regenerators 4 and 5. Cutoff valves 7 and 7 for change-over operation are provided to fuel nozzles 6 of the first burner apparatus 2 and the second burner apparatus 3 so as to alternately supply the fuel. Further, the two combustion air supply means 8 are selectively connected with the exhaust system 11 and the combustion air supply system 12 through a passage change-over means, for example, a four-way valve 10, and the combustion air is supplied from one combustion air supply means 8 while the combustion gas is exhausted from the other combustion air supply means 8. On the other hand, the arbitrary air supplied from the arbitrary gas supply system 13 passes through the first regenerator 4 or the second regenerator 5 to be heated and supplied from the arbitrary gas output means 17 provided in the near-center of the combustion chamber 1 to an arbitrary facility/equipment/position.

With such an arrangement, there are configured a path along which the combustion gas is exhausted through the regenerators 4 and 5 (34) and another path for leading the arbitrary gas into a channel type combustion chamber 1 and supplying that gas from the high-temperature gas output means 17 to an arbitrary position. Here, although the arbitrary gas may be also used as the combustion air, any other type of gas, e.g., inert gas or air with low density of oxygen, or specified gas can be of course used if necessary.

The channel type chamber 1 between the first regenerator 4 and the second regenerator 5 may contain third and fourth regenerators 15 and 16 in which the combustion exhaust gas is heated when exhausted from the burner on the opposed side, if necessary. The third and fourth regenerators 15 and 16 are not used for preheating the combustion air but for heating only the arbitrary gas, and they are installed when it is desirable to prolong the time for supplying the high-temperature gas. Note that the combustion air supply means 8 have the change-over cutoff valves 9 which block the passage of the combustion air when supplying the arbitrary gas.

Although the regenerators 4, 5, 15, 16 and 34 are not restricted to certain shapes or material, it is preferable to use honeycomb-shaped regenerators manufactured by subjecting ceramics such as cordierite or mullite to extrusion molding in order to carry out the change-over operation in a short time and heat exchange between the high-temperature gas having a temperature of approximately 1000° C. such as the combustion exhaust gas and the low-temperature fluid having a room temperature or a temperature of approximately 20° C. such as the combustion air or the arbitrary air with high effectiveness. The honeycomb shape means a hexagonal cell (hole), but the regenerators may have a plurality of cells of a square or triangular shape as well as a hexagonal shape in this specification. In addition, the regenerators are not restricted to be produced from honeycomb-shaped ceramics by integral molding, and it is possible to constitute the regenerator by bundling tubes. Further, when using heat accumulating material such as SiN that can be used at a higher temperature as compared with cordierite or mullite, an aggregate consisting of simple pipes or pipes molded into a rod or a ball shape can be used as the regenerator.

In this apparatus, the first burner apparatus 2 and the second burner apparatus 3 alternately perform combustion; combustion is interrupted when the first regenerator 4 and the second regenerator 5 have reached a predetermined temperature; arbitrary gas is supplied to both or either of the first and second regenerators 4 and 5 in place of the combustion air; the arbitrary gas is heated to have a high temperature by direct heat exchange with the regenerators 4 and 5; and the temperature of the arbitrary gas is made uniform in the regenerator 34 to output the arbitrary gas from the arbitrary gas output means 17.

That is, the second burner apparatus 3 carries out combustion by supplying the fuel and the combustion air through a route indicated by arrows of a solid line, and the high-temperature combustion gas is used to heat the first regenerator 4 and the regenerator 34, and the third and fourth regenerators 15 and 16 that may be installed if necessary. The combustion gas partially passes through the regenerator (and regenerators 15 and 16 depending on the situation) 4 to have a low temperature, and it thereafter passes through the combustion air supply means 8, the cutoff valve 9, the four-way valve 10 and the exhaust system 11 to be emitted in air. Furthermore, the combustion air partially passes through the regenerator 34 and is emitted from the flow control valve 19 through the exhaust system 11'. At this stage, the solenoid valve 18 is closed. The fuel and the combustion air are supplied to the first burner apparatus 2 through a route indicated by arrows of a broken line by change-over operation of the change-over valves 7 and 10. Here, the first regenerator 4 takes sensible heat from the combustion gas in the above-mentioned process and the temperature of the regenerator 4 is thereby increased. The combustion air has, therefore, a high temperature by receiving part of heat accumulated in the regenerator 4, and the combustion gas having a higher temperature can be obtained. Accordingly, a temperature of the combustion chamber can be rapidly raised when the same fuel is used. The temperatures of the combustion chamber and the regenerator can be rapidly increased by repeating alternate combustion and heat accumulation. When a thermo sensor 20 detects that the temperature of the regenerator or the air has reached a predetermined value at, e.g., an air outlet of the second regenerator 5, combustion is stopped and the arbitrary air is led. Here, since the regenerator 34 of the arbitrary air output means 17 is only heated and is not periodically cooled down by the combustion air, the temperature of the regenerator 34 is the same with or higher than a higher temperature of either the regenerator 4 or 5. Before supplying the arbitrary gas, it is preferable to supply the combustion air or the arbitrary gas and scavenge the inside of the combustion chamber 1 and the regenerators 4, 5 and 34 (and the regenerators 15 and 16 depending on the situation). The arbitrary gas receives heat to have a desired temperature when passing through the first or second regenerator 4 or 5 (or the third and fourth regenerators depending on the situation), and differences in temperature of the arbitrary gas are eliminated by passing through the arbitrary gas output means 17 provided in the center of the combustion chamber and the regenerator 34 so that the arbitrary gas is supplied to an arbitrary facility/equipment/position. When the temperature of the gas is maintained below a predetermined temperature or when the batch operation in the next process is completed, supply of the high-temperature gas is stopped by the cutoff valve 18, and the operation is returned to the first process. Note that the combustion air can be used as it is when the arbitrary gas supplied at a high temperature is air. In such a case, the exclusive arbitrary gas supply system 13 is no longer necessary. In addition, the time for changing over the combustion air or the combustion exhaust gas with respect to the regenerators 4 and 5 is not restricted to a certain length, but it is desirable to rapidly carry out the change-over operation within two minutes, or more preferably within one minute, or most preferably within 20 to 40 seconds. In this case, effectiveness of heat exchange is improved, and a velocity for raising the temperature of the regenerator can be increased, thereby shortening the preparation time for supply of the high-temperature gas.

Figure 2:
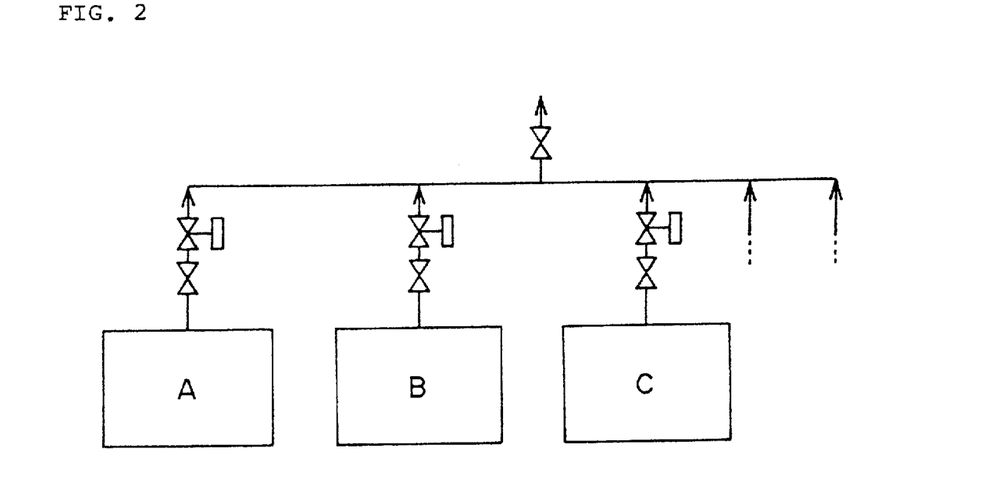
FIG. 2 is principle view showing a second embodiment of the high-temperature generating apparatus according to the present invention.

The above-mentioned apparatus is an example for intermittently supplying the high-temperature gas, and provision of a plurality of these apparatuses in parallel enables continuous supply of the high-temperature gas. For example, as shown in FIG. 2, a plurality of the high-temperature gas generating apparatuses (indicated by frames) illustrated in FIG. 1 are provided in parallel to alternately supply the high-temperature gas, and continuous supply of the gas can be thereby performed on the whole. For example, when two high-temperature gas generating apparatuses A and B are provided in parallel, supply of the gas is changed over in accordance with the gas temperature in the order of A→B; and when three high-temperature gas generating apparatuses A, B and C are provided in parallel, the same operation is repeated in the order of A→B→C. As a result, continuous supply is enabled.

FIGS. 3A to 3D show concrete examples of the apparatus illustrated in FIG. 2. Such an apparatus is basically obtained by a pair of high-temperature gas generating apparatuses illustrated in FIG. 1, and the heated arbitrary gas is alternately output from a right high-temperature gas generating apparatus A and a left high-temperature gas generating apparatus B and supplied to an arbitrary facility/equipment/position in accordance with change-over operation of the three-way valve 21 by connecting via the three-way valve 21 the combustion chambers 1 and 1 of the two high-temperature gas generating apparatuses A and B each having the burner apparatuses 2 and 3 and the regenerators 4 and 5 at both ends of each combustion chamber 1. Note that, in the apparatus of this embodiment, it is also possible to provide the regenerator 34 and the exhaust system 11' in the passage for outputting the arbitrary gas or provide the regenerators 15 and 16 as similar to the embodiment illustrated in FIG. 1.

Figure 3A:
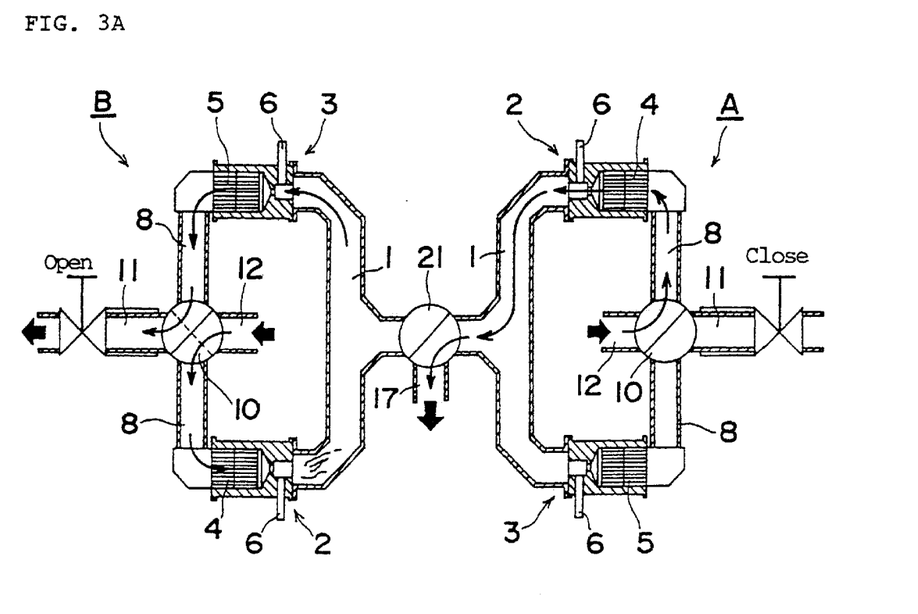
Figure 3B:
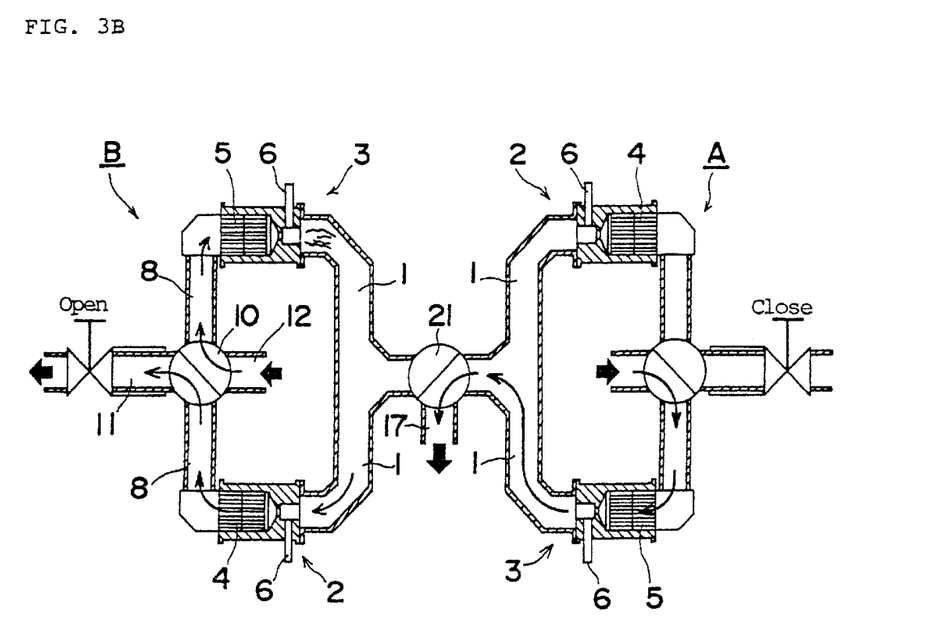

In case of this apparatus, as shown in FIGS. 3A and 3B for example, the burner apparatuses 2 and 3 alternately perform combustion in the high-temperature gas generating apparatus B on the left-hand side so that sensible heat is accumulated in the both regenerators 4 and 5, while arbitrary high-temperature gas, e.g., air is emitted from the high-temperature gas generating apparatus A on the right-hand side. In the high-temperature gas generating apparatus A on the right-hand side, for example, when the high-temperature gas is obtained by flowing the air into the regenerator 4, the regenerator 5 is reserved for heat accumulation in the next cycle. On the other hand, in the high-temperature gas generating apparatus B on the left-hand side, the combustion air preheated through the regenerator 4 is used to perform combustion. The combustion air then passes through the regenerator 5 in the burner apparatus 3 on the opposed side to be emitted from the exhaust system 11 having a water jacket (see FIG. 3A). Combustion in the burner apparatuses 2 and 3 are alternately performed until the regenerators 4 and 5 reach a predetermined temperature (see FIG. 3B), and heat accumulation is effected for the next cycle.

Figure 3C:
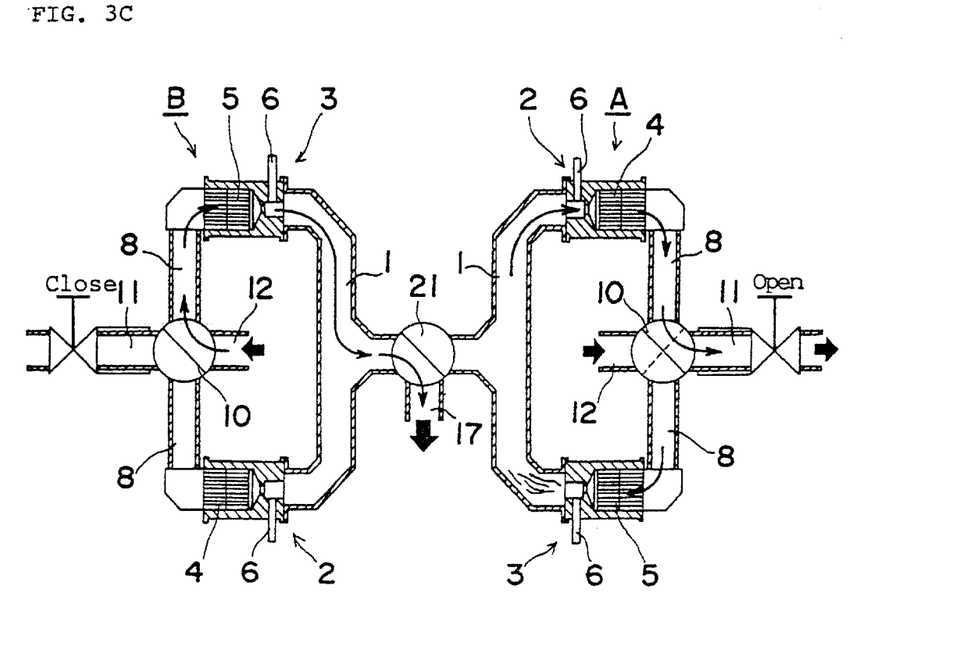
Figure 3D:
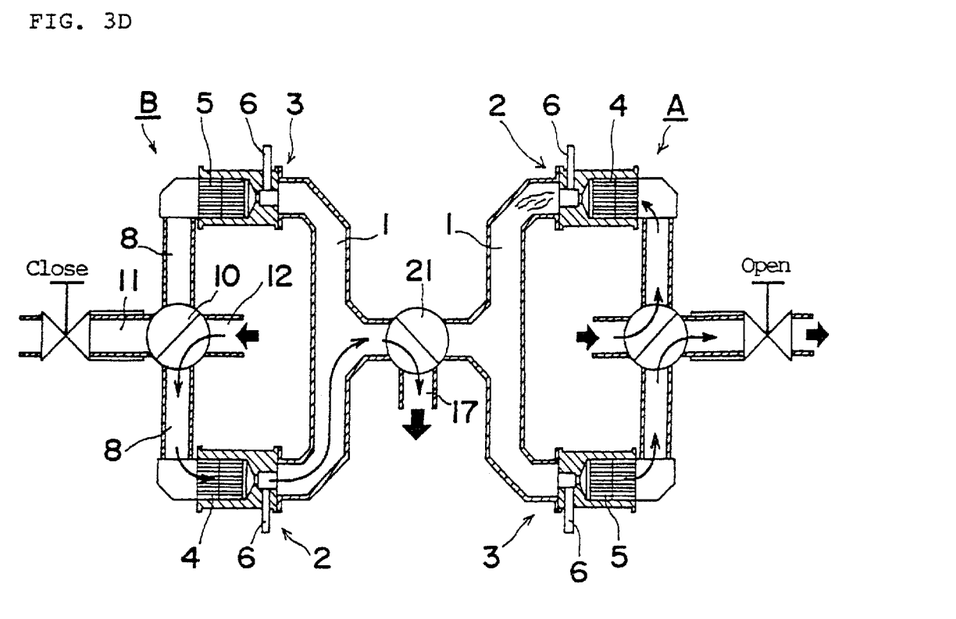

After heat of the both regenerators 4 and 5 in the high-temperature gas generating apparatus A on the right-hand side has been completely used, the burner apparatuses 2 and 3 in the right high-temperature gas generating apparatus A alternately carry out combustion to start heating/heat accumulation of the regenerators 4 and 5, as shown in FIG. 3C. Combustion in the high-temperature gas generating apparatus B on the left-hand side is stopped to supply only the air, and the high-temperature air is obtained through the regenerator 5 on the other side to be supplied to a testing device or the like. After the regenerator 5 has been cooled down to have a predetermined temperature, the four-way valve 10 is changed over to flow the air to the regenerator 4, thus obtaining the high-temperature air (see FIG. 3D). In this manner, temperatures of the regenerators 4 and 5 are increased to accumulate heat by alternate combustion in the high-temperature gas generating apparatus A on the right-hand side, while emitting the high-temperature air using the two regenerators 4 and 5 in the high-temperature gas generating apparatus B on the left-hand side. The high-temperature gas can be continuously supplied by alternately repeating heating and emission of the high-temperature gas in the high-temperature gas generating apparatuses A and B on the both sides.

Figure 4:
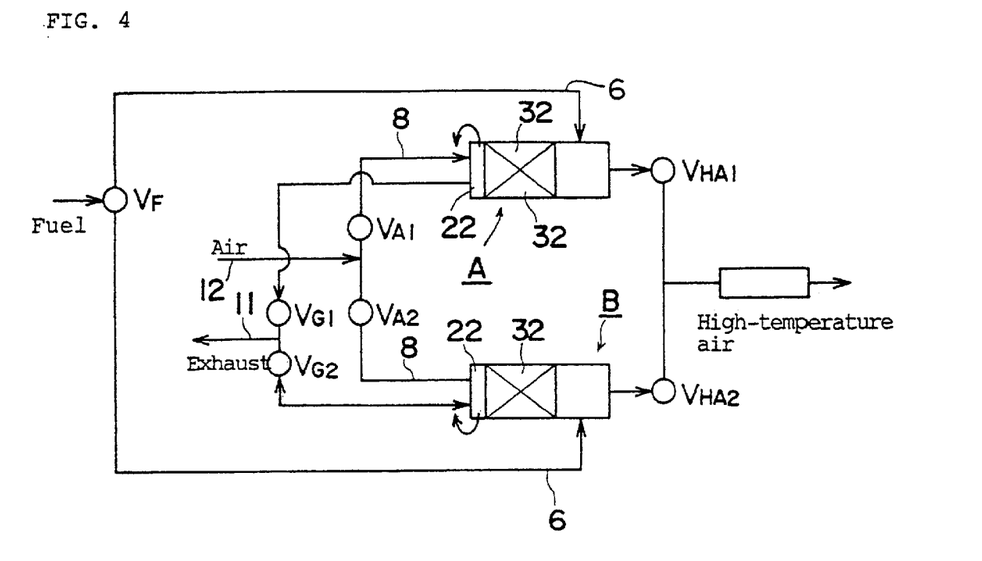
FIG. 4 is a principle view showing a third embodiment of the high-temperature gas generating apparatus according to the present invention.

FIG. 4 shows still another embodiment. The high-temperature gas generating apparatus according to this embodiment includes a pair of burner apparatuses 2 and 3 which have regenerators 32 each of which can pass the combustion air and the combustion gas through the same area at different times by relative rotation between two passages 27 and 28 for flowing the combustion air and the combustion gas and can transmit sensible heat of the combustion gas to the combustion air with high effectiveness, and increase temperatures of the regenerators 32 to accumulate heat by supplying the combustion air and exhausting the combustion gas through the regenerators 32. The high-temperature gas generating apparatus supplies the air to the respective burner apparatuses 2 and 3 and flows this air through the regenerators 32. Further, the air is used to carry out combustion in one burner, while the air is heated as arbitrary gas that is a target of heating by the regenerator 32 in the other burner apparatus so that the air is heated to be continuously supplied to the outside. More particularly, the combustion gas is not moved between the burner apparatuses 2 and 3 provided at both ends of the combustion chamber 1; passage change-over means 22 are used to independently constitute the high-temperature gas generating apparatuses A and B in accordance with the respective burners 2 and 3; and supply of the combustion air and exhaust of the exhaust gas obtained by combustion are simultaneously carried out at different portion/areas in the same one regenerator 32 to perform heat exchange. Note that the regenerator 32 may preferably have the composition and configuration similar to those of the regenerators shown in FIGS. 1 to 3.

Figure 5A:
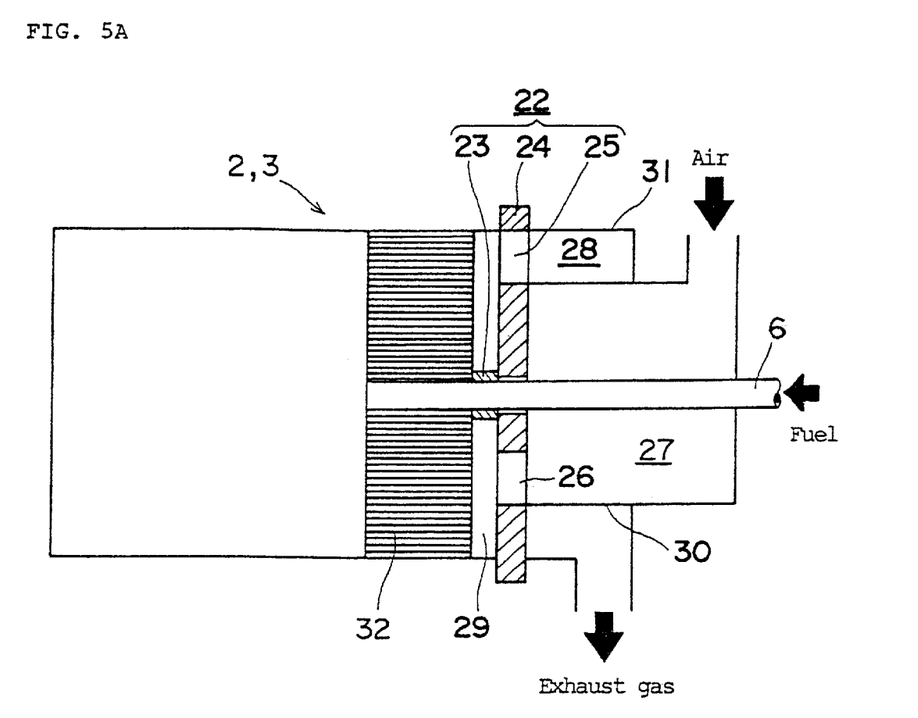
FIG. 5 is a principle view showing an example of a passage change-over apparatus of the high-temperature gas generating apparatus according to the present invention illustrated in FIG. 4.
Figure 5B:
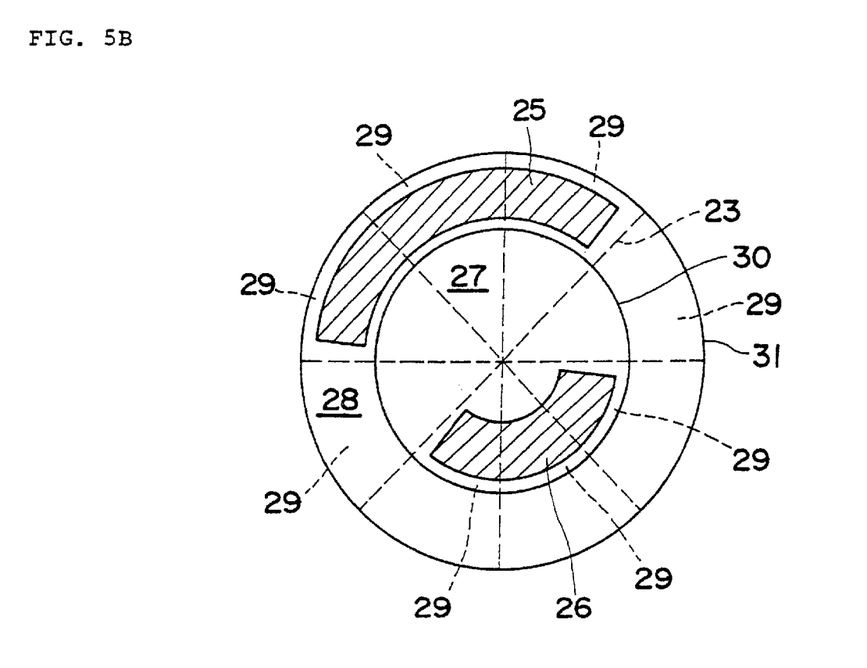

Although the passage change-over means 22 is not restricted to certain type, it is preferable to use the passage change-over apparatus disclosed in International laid-open publication No. WO94/02784 which has been already proposed by the present applicants or Japanese patent laid-open publications Nos. 5-198,776 or 5-269,437 and it is more preferable to use a rotary disc type passage change-over means. For example, as shown in FIGS. 5A and 5B, on the upstream side of the regenerator 32 are provided a radial partition wall 23 for partitioning a plurality of chambers 29 in the circumferential direction and cylinders 30 and 31 overlapped one on another for concentrically partitioning an air supply chamber 27 and an exhaust chamber 28 in the radial direction. A change-over means 24 made up of a disc perpendicular to a fluid passage is disposed between the cylinders 30 and 31 having a dual configuration and the partition wall 23. The change-over means 24 has a supply communicating hole 26 for communicating an air supply chamber 27 with an arbitrary chamber 29 and an exhaust communicating hole 25 for communicating an exhaust chamber 28 with the arbitrary chamber 29, and the air supply chamber 27 and the exhaust chamber 28 can simultaneously communicate with different areas in one regenerator 32. The air supply chamber 27 is connected with a combustion air supply system 12 and an arbitrary gas supply system 13, and the exhaust chamber 28 is connected with the exhaust system 11. At this time, the exhaust communicating hole 25 and the air supply communicating hole 26 do not simultaneously exist in the same chamber/compartment 29, and the chamber/compartment 29 that does not communicate with either of the air supply communicating hole 26 and the exhaust communicating hole 25 is positioned between the air supply communicating hole 26 and the exhaust communicating hole 25. The passage in one regenerator 32 can be so controlled as to be divided in the circumferential direction and continuously changed over by rotating the disc 24 that is the change-over means, and the air and the exhaust gas can partially flow into the regenerator at the same time, respectively. Note that a pipe for supplying the arbitrary gas may be connected to the air supply chamber 27 separately from the combustion air supply system 12 to flow any desired gas to the regenerator 32 in place of the combustion air.

Figure 6:
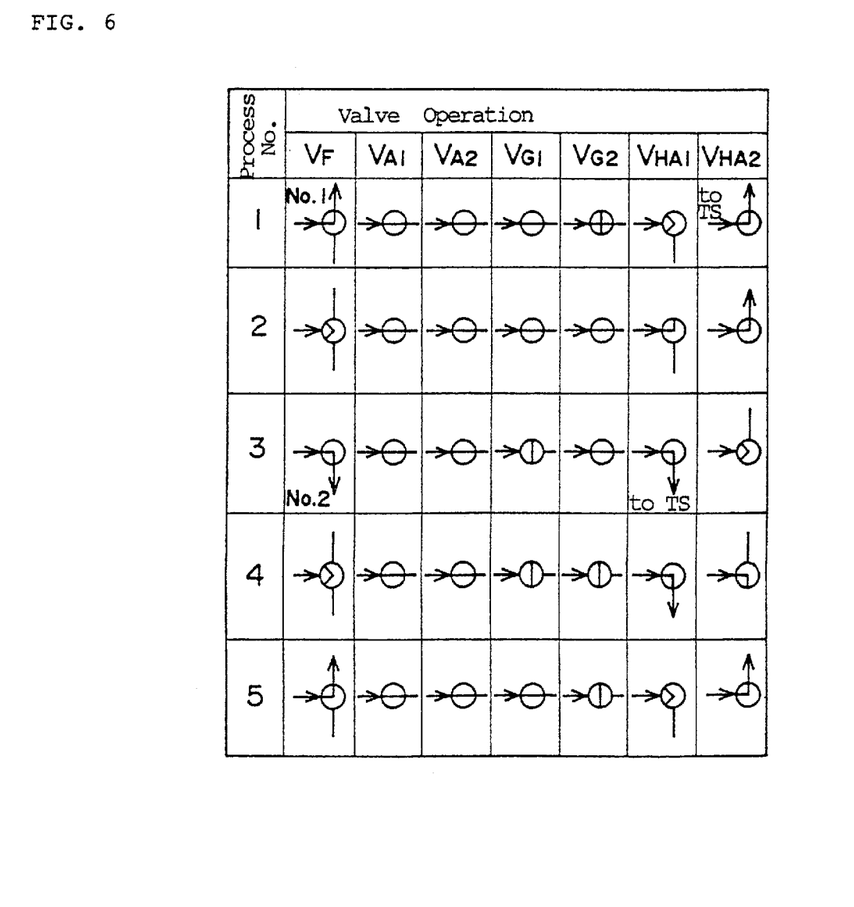
FIG. 6 is a chart showing relationships between states of operation of the apparatus illustrated in FIG. 4 and states of operation of valves.

In case of this system, the high-temperature air can be continuously supplied by operating each valve as shown in FIG. 6. In the first place, the fuel is supplied to a first high-temperature gas generating apparatus A while the air is supplied to both the first high-temperature gas generating apparatus A and a second high-temperature gas generating apparatus B, and the supplied fuel and air are diffused and burnt in the first high-temperature gas generating apparatus A while the combustion gas is emitted outside the combustion chamber through a compartment different from that for supplying the air in the regenerator 32 and exhausted in air via the exhaust system 11. At this stage, a valve VHA1 of the first high-temperature gas generating apparatus A, used for opening and/or closing a passage connecting a test section (test chamber requiring the high-temperature gas) with the respective high-temperature gas generating apparatuses A and B, is closed and a valve VHA2 of the second high-temperature gas generating apparatus B is opened for communication and supplies the air that have passed through the regenerator in the second high-temperature gas generating apparatus B to a test section. In this system, the valves VA1 and VA2 are constantly opened and the air is constantly supplied to the first high-temperature gas generating apparatus A and the second high-temperature gas generating apparatus B. The valve VF is changed over to supply the fuel to either the first high-temperature gas generating apparatus A or the second high-temperature gas generating apparatus B or non of them. Further, the combustion gas can be taken out from the first high-temperature gas generating apparatus A and the second high-temperature gas generating apparatus B to be exhausted by opening and/or closing valves VG1 and VG2 (first process).

Supply of the fuel to the first high-temperature gas generating apparatus A is subsequently interrupted to open a supply line for scavenging, and the valve VHA2 of the second high-temperature gas generating apparatus B communicates with the test section to supply the air which has been preheated by passing through the regenerator 32 of the second high-temperature gas generating apparatus B (second process). The valve VHA1 of the first high-temperature gas generating apparatus A then communicates with a test section, while the fuel is supplied to the second high-temperature gas generating apparatus B and the valve VHA2 is closed to stop supply of the air to the test section (third process). Here, the valve VG1 is closed to block the exhaust system 11 of the first high-temperature gas generating apparatus A. As a result, the air supplied to the first high-temperature gas generating apparatus A through the regenerator 32 is heated to have a high temperature and supplied to the test section. Furthermore, combustion is effected using the air preheated by the regenerator 32 in the second high-temperature gas generating apparatus B, and the combustion gas passes through the different area in the regenerator 32 to be exhausted in the air from the exhaust system 11. Heat is consequently accumulated in the regenerator 32 of the second high-temperature gas generating apparatus B. Supply of the fuel to the first high-temperature gas generating apparatus A and the second high-temperature gas generating apparatus B is then interrupted, and only the air is supplied to both the first high-temperature gas generating apparatus A and the second high-temperature gas generating apparatus B at the same time. At this stage, the valves VG1 and VG2 of the exhaust system 11 are closed and the air is not hence emitted from the exhaust system 11. The air supplied to the first high-temperature gas generating apparatus A is, therefore, preheated by the regenerator 32 and supplied to the test section as the high-temperature air, while the air supplied to the second high-temperature gas generating apparatus B scavenges the inside of the high-temperature gas generating apparatus B and is exhausted from the valve VHA2 (fourth process). Moreover, in the next process, the fuel is supplied to the second high-temperature gas generating apparatus A by a change-over operation of the valve VF, while the air in the second high-temperature gas generating apparatus B can not be emitted from the exhaust system when the valve VG2 is closed. Also, the valve VHA1 is closed and the valve VHA2 communicates with the test section. Supply of the air from the first high-temperature gas generating apparatus A to the test section is thus stopped and heating of the regenerator 32 is started, while the air supplied to the second high-temperature gas generating apparatus B is preheated by the regenerator 32 and sent to the test section as the high-temperature air (fifth process). The high-temperature air is continuously supplied to the test section by repeating the first to fifth processes.

In case of continuously supplying the high-temperature gas by using changing over two or more regenerators, provision of a flow straightening cylinder can suppress the so-called pulsating flow such that supply of the high-temperature gas is instantaneously interrupted when changing over the fluid.

Figure 7:
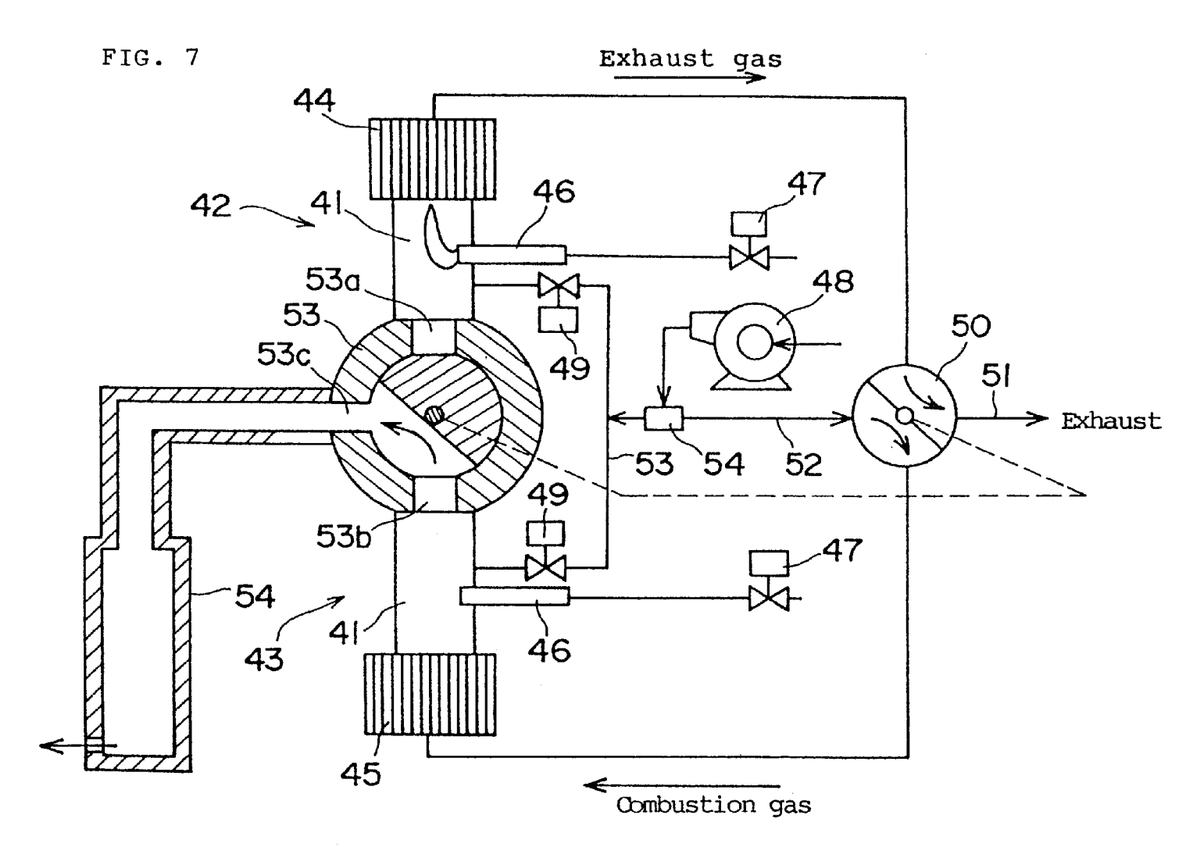
FIG. 7 is a principle view showing a fourth embodiment of the high-temperature gas generating apparatus according to the present invention.

FIG. 7 shows an embodiment having a flow straightening cylinder. This high-temperature gas generating apparatus is provided with a pair of burner apparatuses 42 and 43 each of which has a regenerator 44 or 45 and performs supply of arbitrary gas that is to be heated through the regenerator 44 or 45 and exhaust of the combustion gas, and connects combustion chambers 41 of the respective burner apparatuses 42 and 43 to a high-temperature gas output means 53, respectively. A three-way valve is adopted as the high-temperature output means 53, and the combustion chambers 41 of the burner apparatuses 42 and 43 are connected with two opposed ports 53a and 53b of the three-way valve, the remaining port 53c of the same being connected with a flow straightening cylinder 54 as a high-temperature gas output port. Here, the flow straightening cylinder 54 is usually a cylinder having a large cross section, and to inside of the flow straightening cylinder 54 is provided a non-illustrated wire gauze where ununiformity or irregularity in the flow can be eliminated. That is, the flow straightening cylinder 54 gives enough time for reducing unbalance or velocity fluctuation of the flow generated in a fluid supply portion.

Outlets of the respective regenerators 44 and 45 are connected to opposed ports of a four-way valve 50 so that they can be selectively connected with an arbitrary gas supply system 52 for supplying arbitrary gas that is to be heated, e.g., air and an exhaust system 51 for exhausting combustion gas. There are constituted a path along which the combustion gas is exhausted through one of the regenerators 44 and 45 of the burner apparatuses 42 and 43 and another path along which the arbitrary gas that is to be heated is led into the combustion chamber 41 through the regenerator 45 or 44 and supplied to any desired position via a three-way valve 53 that is the high-temperature gas output means. The air compressed and supplied from a fan 48 is divided by a dividing means 54 so that it can be partially provided to the respective combustion chambers 41 between the three-way valve 53 and the regenerators 44 and 45. An air supply system 53 connected to the respective combustion chambers 41 is provided with two solenoid valves 49 to enable interruption of supply of the combustion air. Each of the combustion chamber 41 is connected with a fuel nozzle 46 for injecting fuel so that supply of the fuel can be arbitrary interrupted by each solenoid valve 47. Here, as the three-way valve 53 for changing over the flow of the high-temperature gas, it is preferable to use one constituted by heat-resisting ceramics with low coefficient of linear expansion such as mullite because the gas having a high temperature of approximately 1000° C. (1273° K.) may flow therethrough.

According to the high-temperature gas generating apparatus having such a structure, the high-temperature gas can be alternately generated and continuously supplied by performing combustion alternately in the burner apparatuses 42 and 43 and changing over the two paths, i.e., the arbitrary gas supplying path and the exhaust path. That is, part of the air supplied by the fan 48 can be injected to one combustion chamber 41 through the air supply system 53, and the remaining part of the air is supplied to the regenerator 45 or 44 connected to the other combustion chamber 41 through the four-way valve 50 as the arbitrary gas and subjected to heat exchange in the regenerator 45 or 44 to have a high temperature, thereby being supplied to the flow straightening cylinder 54 through the three-way valve 53. The air supplied to one combustion chamber 41 is used to burn the fuel in the combustion chamber 41, and the high-temperature combustion gas is thereby generated. The combustion gas is cooled down by flowing through the regenerator 44 or 45 to heat that regenerator. The combustion gas is then emitted from the exhaust system 51 through the four-way valve 50. When a predetermined time, e.g., approximately 30 seconds, has lapsed, the four-way valve 50 is rotated to change over the flow of the air, and the burner apparatus 42 or 41 that is currently performing combustion is stopped to carry out combustion in the other burner apparatus 41 or 42. At this stage, fresh air flows into the combustion chamber of one burner apparatus that was performing combustion to effect scavenging before carrying out combustion in the other burner apparatus by interrupting supply of the fuel immediately before changing over the flow of the air. Then, the gas is heated by the heated regenerator and supplied to the flow straightening cylinder 54 by supplying the gas that is to be heated, i.e., the air. The pulsating flow of the high-temperature gas is smoothed in the flow straightening cylinder 54. The gas/air that is to be heated can not be polluted because scavenging performed immediately before changing over the flow of the air completely flows the combustion exhaust gas into the exhaust system 51.

Figure 8:
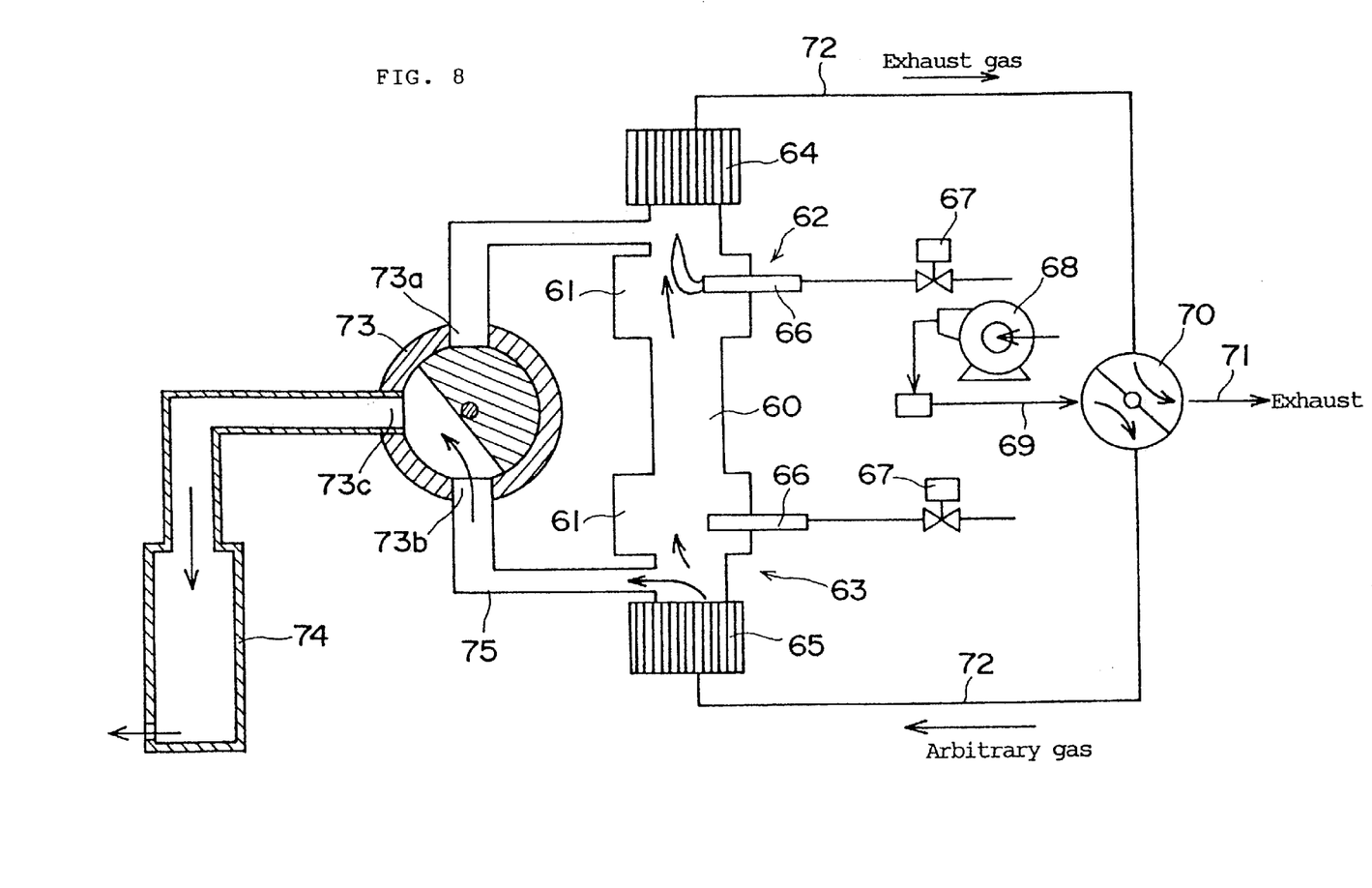
FIG. 8 is a principle view showing a fifth embodiment of the high-temperature gas generating apparatus according to the present invention.

FIG. 8 shows a still further embodiment. This embodiment, enabling use of low-calorie gas as the fuel, has such a configuration as that: combustion chambers 61 of a pair of burner apparatuses 62 and 63 that have regenerators 64 and 65 and perform supply of arbitrary gas to be heated and exhaust of combustion gas through the regenerators 64 and 65 are connected with each other via a connecting path 60; a bypass path 75 is provided for connecting spaces between the respective combustion chambers 61 and the respective regenerators 64 and 65; a three-way valve 73 is provided to the bypass passage 75 as a high-temperature output means; and a remaining port 73c functions as a high-temperature gas output port to which a flow straightening cylinder 74 is connected. A pair of burner apparatuses 62 and 63 have the combustion chambers 61 connected to each other, and the regenerators 64 and 65 are disposed to the two burner apparatuses 62 and 63 at both ends, outlets of the regenerators 64 and 65 being connected with a four-way valve 70 in the duct 72 to be selectively linked with an air supply system 69 and an exhaust system 71. In case of this high-temperature gas generating apparatus, air supplied from the air supply system 69 flows through the heated regenerator 65 or 64 to have a high temperature, and part of the air is supplied to the flow straightening cylinder 74 via the bypass passage 75 while the remaining part thereof is supplied to the burner apparatus 62 or 63 provided just in front of the regenerator 64 or 65 on the opposed side to be used for combustion. The burner apparatus 62 or 63, therefore, use the high-temperature combustion air of, e.g., approximately 1000 to 1600° K., and the low-calorie gas can be thereby burnt as the fuel easily. The thus-generated combustion gas passes through the regenerator 64 or 65 to heat that regenerator and is exhausted from the four-way valve 70 as exhaust gas.

According to the embodiments illustrated in FIGS. 7 and 8, provision of the flow straightening cylinders 54 and 74 can suppress pulsation generated when changing over the air, and high-temperature clean air can be continuously supplied for a long time. In applications in which minute pulsation is not a problem, any specific drawback does not occur from no existence of the flow straightening cylinders 54 and 74. In addition, the flow straightening cylinders 54 and 74 can be applied to the embodiments illustrated in FIGS. 2 to 4, and the similar effects can be obtained in such a case. It is preferable to use the regenerators 44, 45, 64 and 65 having the composition and structure similar to those of the regenerator illustrated in FIGS. 1 to 3.

Figure 9:
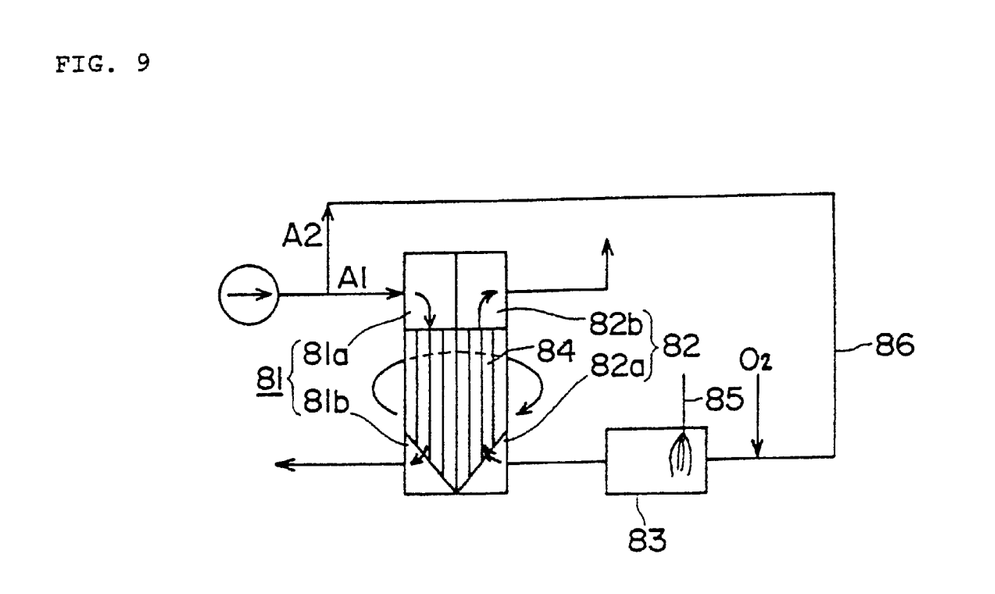
FIG. 9 is a principle view showing a sixth embodiment of the high-temperature gas generating apparatus according to the present invention.
Figure 10:
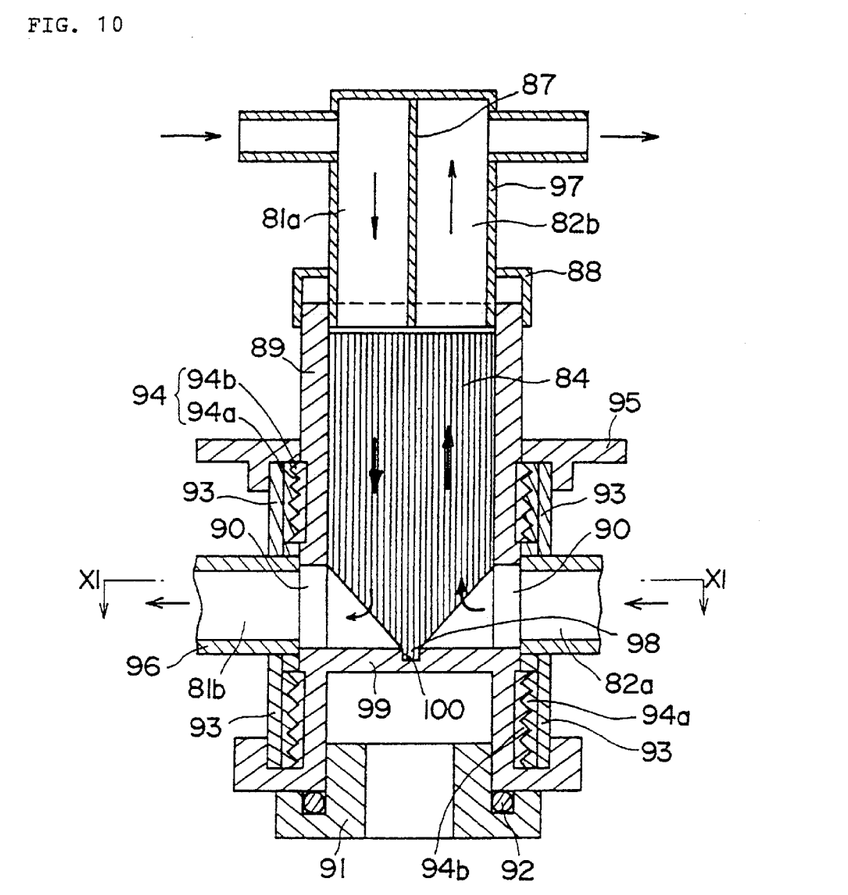
FIG. 10 is a vertical cross-sectional view showing a specific configuration of a rotary heat exchanger that is a primary part of the high-temperature gas generating apparatus illustrated in FIG. 9.
Figure 11:
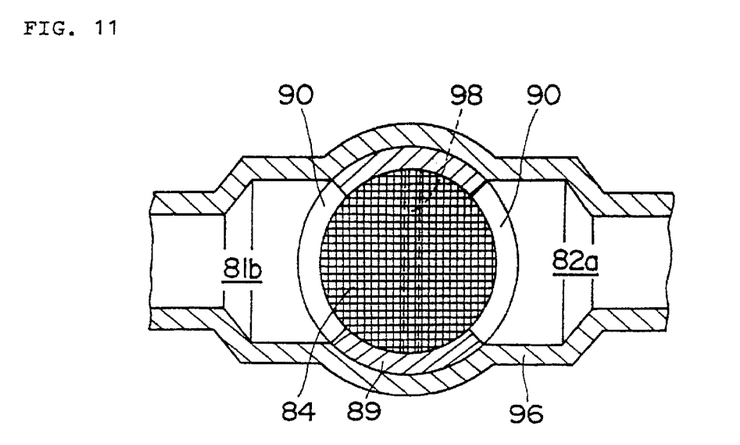
FIG. 11 is a cross-sectional view taken long a XI—XI line in FIG. 10.

FIGS. 9 to 11 show a still further embodiment. This embodiment alternately passes the combustion gas and the arbitrary gas without interrupting combustion in the burner apparatus 83 by rotating the regenerator 84 to continuously supply the heated arbitrary gas. The high-temperature gas generating apparatus in this embodiment is constituted by two passages 81 and 82 for flowing the arbitrary gas that is to be heated and the combustion gas, a regenerator 84 which is provided in the middle of the two passages 81 and 82 and can pass the arbitrary gas and the combustion gas through the same area at different times by relative rotation between the passages 81 and 82 to transmits sensible heat of the combustion gas to the arbitrary gas with high effectiveness, and a burner apparatus 83 for supplying the combustion gas to the regenerator 84.

Here, the two passages 81 and 82 are made up of a fixed leading passage 81a for supplying the arbitrary gas to the regenerator 84 between the passages 81 and 82, a high-temperature gas output passage 81b for supplying to an external facility or the like the arbitrary gas heated by passing through the regenerator 84, an exhaust passage 82b for exhausting the combustion gas cooled down by passing through the regenerator 84 and a passage 82a for leading the combustion gas that is to be supplied to the regenerator 84. The passages 81 and 82 are designed so that the arbitrary gas is supplied from the leading passage 81a to a part of the regenerator 84 to pass therethrough and the arbitrary gas is then output from the high-temperature gas output passage 81b while the combustion gas in the burner apparatus 83 passes through another part of the regenerator 84 to be exhausted from the exhaust passage 82b, thereby heating the regenerator 84. Flows of the gas passing through the regenerator 84 can be changed over by continuously or intermittently rotating the regenerator 84 when the regenerator 84 has reached a predetermined temperature without interrupting flows of the gas in the combustion gas leading passage 82a and the arbitrary gas leading passage 81a, i.e.. without interrupting combustion in the burner apparatus 83, and the high-temperature gas having a predetermined temperature such as air can be continuously supplied.

A cylinder type casing 89 has openings at its upper end and on the peripheral surface close to the bottom. As openings on the peripheral surface, two openings 90 are formed at positions opposed to each other so that one opening 90 communicates with the combustion gas leading passage 82a and the other opening 90 communicates with the output passage 81b for the arbitrary gas having a high temperature. A table 99 for supporting a lower edge of the regenerator 84 is provided below the openings 90 of the casing 89. A groove 100 crossing the table surface is formed on a surface opposed to the regenerator 84 disposed in the center of the table 99. In addition, a protrusion 98 crossing the regenerator 84 is provided in the center of the end surface of the regenerator 84 opposed to the table 99, and this protrusion 98 is engaged with the groove 100 of the table 99 to achieve sealing between the table 99 and the regenerator 84. On the other hand, to the opening at the upper edge of the casing 89 is connected with a cylindrical pipe 97 constituted by the fixed leading passage 81a for supplying the arbitrary gas to the regenerator 84 and the exhaust passage 82b for exhausting the combustion gas having passed through the regenerator 84 in such a manner that the cylindrical pipe 97 can rotate with respect to the casing 89. The cylindrical pipe 97 is divided into the leading passage 81a and the exhaust passage 82a by vertically partitioning the central part of inside thereof using a partitioning wall 87.

The regenerator 84 is supported by a bearing stand 91 and a holder 93 in such a manner the regenerator 84 is accommodated in the casing 89 and can rotate together with the casing 89. Between the holder 93 and the casing 89 is provided a sealing mechanism 94 obtained by combining irregularities having corrugated axial cross sections which can rotate in the circumferential direction and can be engaged with each other in the axial direction. For example, a half cylindrical member 94a having bellows type irregularities on the inner surface thereof is fixed to the holder 93 and another cylindrical member 94b having irregularities on the surface thereof is fixed to the casing 89 so that one member is shifted ½ pitch with respect to the other member, and the cylindrical members are engaged with each other in such a manner that irregularities on one member mesh with those on the other member to achieve sealing. This sealing mechanism 94 can reduce outward leakage of the air or the combustion gas. In addition, an O-ring is disposed between the casing 89 and the bearing stand 91 to attain sealing.

The regenerator 84 has a wedge slanting surface at one edge communicating with the high-temperature gas output passage 81b and the combustion gas leading passage 82a. The passage 82a for leading the combustion gas to the regenerator 84 and the passage 81b for outputting the arbitrary gas heated through the regenerator 84 are so arranged as to face the wedge type edge orthogonally with respect to the regenerator 84. With this structure, the combustion gas is uniformly dispersed in the regenerator 84 facing the combustion gas leading passage 82a and passes through the regenerator 84. The high-temperature gas output passage 81b and the combustion gas leading passage 82a are formed by partitioning the inside of one duct 96 with the wedge type edge of the regenerator 84 and the casing 89. Note that the regenerator 84 may preferably have the composition and structure similar to those of the regenerators illustrated in FIGS. 1 to 3.

The burner apparatus 83 mainly burns the gas fuel using the oxygen-enriched combustion air. A quantity of the combustion gas can be further reduced as compared with the case where combustion is carried out using only the air, and relationship of the gas volume and pressure between the air A1 supplied to be heated when passing through the regenerator 84 and the combustion gas A2 is represented as A1>>A2, and the combustion gas can be substantially prevented from leaking to be mixed with the high-temperature gas, thus avoiding pollution of the gas that is to be heated with the combustion gas. Note that, in the present embodiment, the arbitrary gas is air and part thereof A2 is used as the combustion air while the remaining part thereof A1 is heated by the regenerator 84 and supplied to desired facilities. In this case, a temperature of the supplied air can be adjusted by changing a ratio A1/A2. It is needless to say that the combustion air may be differentiated from the arbitrary air and gas other than the air may be supplied from any other passage.

While this invention has been described with reference to the above embodiments, this description is not intended to be construed in a limiting sense, and various modifications of the embodiments are possible within the true scope of the invention.

Industrial Availability of the Invention

The present invention can be used as a high-temperature gas supply source in an experimental device utilizing gas having a high-temperature of approximately 1000° C. or a pyrogenetic reaction apparatus for a product that does not allow mixture of impurities such as a device testing cracking and/or ignition characteristic of various fuels. Further, the high-temperature air can be utilized as oxidizing agent. For example, it may be used for peeling off inserted sand in an aluminum casting cured with resin.

Furthermore, the generated high-temperature air can be lead into a separately-prepared combustion chamber to incinerate a flame retardant solid matter. In this embodiment, since the high-temperature air can be continuously generated and supplied, data can be continuously measured in an experimental device requiring high-temperature atmosphere. For example, the present invention can be utilized for increasing a CVD (Chemical Vapor Deposition) reaction temperature, thereby enabling the experiment without using expensive hydrogen or oxygen.

What is claimed is:

1. A high-temperature gas generating apparatus characterized in that: a burner apparatus which has a regenerator and exhausts combustion gas through the regenerator is provided at both ends of a channel type combustion chamber having a high-temperature gas output means; the regenerator of each burner apparatus is connected with an exhaust means and a supply means for arbitrary gas that is to be heated to constitute a path along which the combustion gas is exhausted through the regenerator and another path along which the arbitrary gas is led into the channel type combustion chamber and supplied from the high-temperature gas output means to an arbitrary position; and after temperatures of the both regenerators are increased to reach a predetermined value by alternately performing combustion in the burner apparatuses, combustion is interrupted to pass the arbitrary gas through the regenerators so that the arbitrary gas having a predetermined temperature is supplied from the high-temperature gas output means to the outside for a predetermined time.

2. A high-temperature gas generating apparatus as set forth in claim 1, wherein a plurality of high-temperature gas generating apparatuses are provided and their high-temperature gas output means are connected to each other via a passage change-over means to continuously generate and supply high-temperature gas by a change-over operation of the passage change-over means.

3. A high-temperature gas generating apparatus as set forth in claim 2, wherein a flow straightening cylinder is provided to the high-temperature gas output means.

4. A high-temperature gas generating apparatus as set forth in claim 1, wherein a regenerator which does not perform heat exchange with the combustion air and is only heated by the combustion gas is provided in the high-temperature gas output means and an exhaust system is connected to the high-temperature gas output means, and the combustion gas is partially exhausted through the regenerator in the high-temperature gas output means during alternate combustion to be only used for heating the arbitrary gas that is a target of heating.

5. A high-temperature gas generating apparatus as set forth in claim 1, wherein injection of fuel to the burner apparatus is interrupted immediately before changing over the flow to carry out scavenging using fresh air.

6. A high-temperature gas generating apparatus characterized in that: a pair of burner apparatuses each of which has a regenerator and performs supply of arbitrary gas to be heated and exhaust of combustion gas are provided and a combustion chamber of each burner apparatus is connected with a high-temperature gas output means; a path along which the combustion gas is exhausted through the regenerator of one burner apparatus and another path along which arbitrary gas to be heated is led into the combustion chamber via the regenerator and the heated arbitrary gas is supplied from the high-temperature gas output means to an arbitrary position are constituted; and the high-temperature gas continuously generated and supplied by alternately performing combustion in the burner apparatuses and changing over the two paths.

7. A high-temperature gas generating apparatus as set forth in claim 6, wherein the high-temperature gas output means is a three-way valve for connecting the combustion chambers of the pair of burner apparatuses with each other, a remaining port of the three-way valve functions as a high-temperature gas output port, and the combustion chambers of the burner apparatuses are alternately opened.

8. A high-temperature gas generating apparatus as set forth in claim 6, wherein a bypass path for connecting the combustion chambers of the pair of burner apparatuses and connecting spaces between the respective chambers and the respective regenerators is provided; a three-way valve is provided to the bypass path and a remaining port of the valve functions as the high-temperature gas output port; a four-way valve that is selectively connected with an air supply system and an exhaust system is connected to an output of each regenerator; and air supplied from the air supply system is preheated to have a high temperature by passing through the regenerator and part of the air is burnt by a burner disposed just in front of the other regenerator as combustion air, while part of the preheated air is continuously supplied from the high-temperature gas output port to the outside through the bypass path.

9. A high-temperature gas generating apparatus as set forth in claim 6, comprising at least a pair of burner apparatuses which have regenerators that can relatively rotate between two passages for flowing combustion air and combustion gas to pass the combustion air and the combustion gas through the same area at different times and transmit sensible heat of the combustion gas to the combustion air with high effectiveness, and which perform supply of the combustion air and exhaust of the combustion gas through the regenerators to increase temperatures of the regenerators, air being supplied to each burner apparatus while the air being passed through the regenerators, the air being used to perform combustion in one burner apparatus while the air being heated by the regenerators as arbitrary gas to be heated in the other burner apparatus to be continuously supplied to the outside.

10. A high-temperature gas generating apparatus as set forth in claim 9, wherein the burner apparatus uses oxygen-enriched air to mainly burn gas fuel.

11. A high-temperature gas generating apparatus comprising: two passages for flowing arbitrary gas to be heated and combustion gas; a regenerator which is connected in the middle of the two passages and can pass the arbitrary gas and the combustion gas through the same area at different times by relative rotation between the two passages to transmit sensible heat of the combustion gas to the arbitrary gas with high effectiveness; and a burner apparatus for exhausting the combustion gas through the regenerator, one edge of the regenerator being formed into a conical shape and the passage for leading the combustion gas to the regenerator and the passage for outputting arbitrary gas heated through the regenerator being disposed to face the conical edge and to be orthogonal to the regenerator, exhaust of the combustion gas and supply of the arbitrary gas being simultaneously performed through different areas in the regenerator, the arbitrary gas heated to a predetermined temperature being continuously supplied outside by intermittently and continuously rotating the regenerator to relatively changing over the gases passing through the regenerator when having reached a predetermined temperature.

* * * * *